(No Model.)
W. E. BROOKE.
SAW TOOTH.
No. 446,810. Patented Feb. 17, 1891.
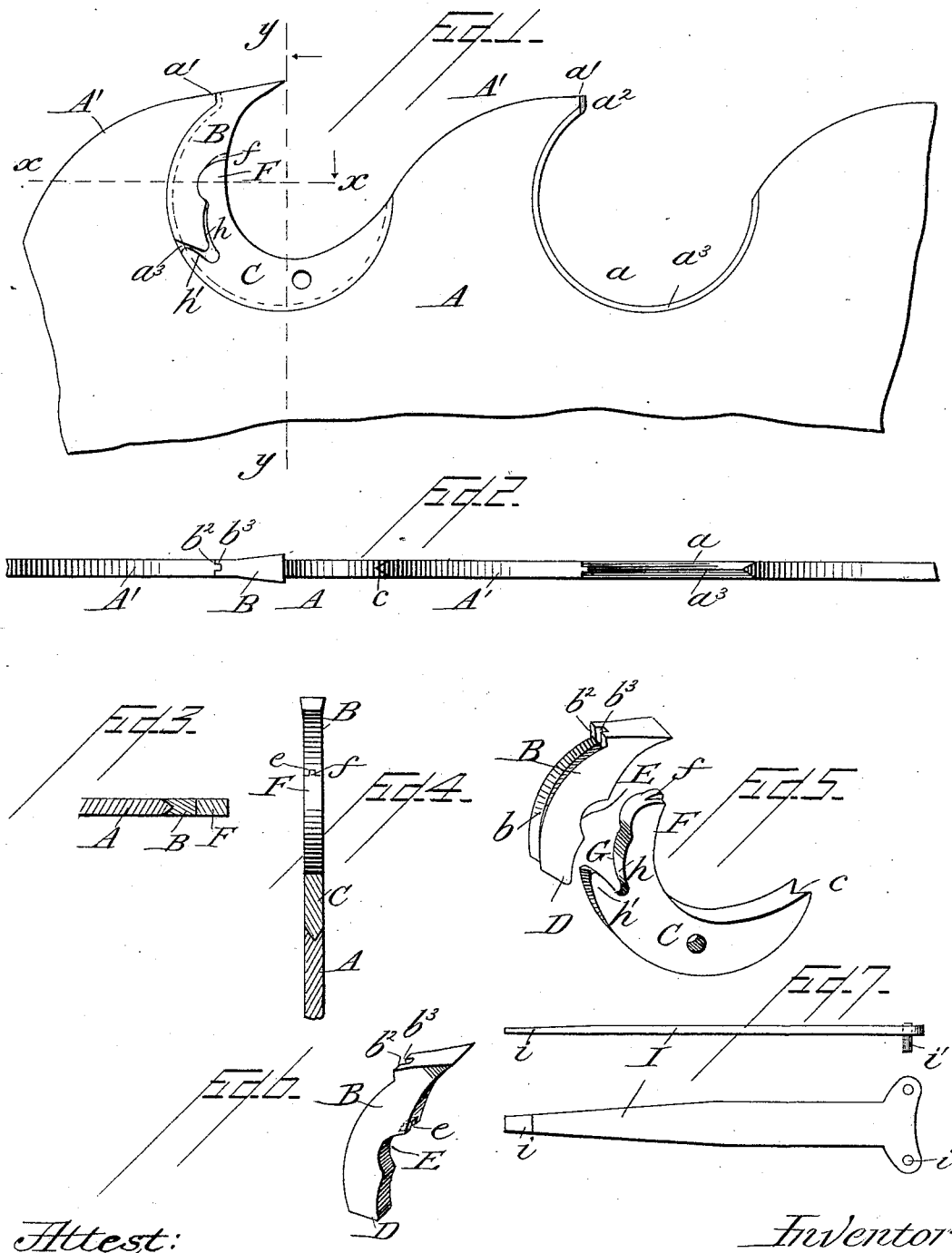
Attest:
H. H. Schott
Wm. L. Boyden
Inventor
William E. Brooke
per John E. Tasker.
Atty.

UNITED STATES PATENT OFFICE.

WILLIAM E. BROOKE, OF TRENTON, NEW JERSEY, ASSIGNOR TO THE AMERICAN SAW COMPANY, OF SAME PLACE.

SAW-TOOTH.

SPECIFICATION forming part of Letters Patent No. 446,810, dated February 17, 1891.

Application filed September 25, 1890. Serial No. 366,121. (No model.)

*To all whom it may concern:*

Be it known that I, WILLIAM E. BROOKE, a citizen of the United States, residing at Trenton, in the county of Mercer and State of New Jersey, have invented certain new and useful Improvements in Saw-Teeth; and I do hereby declare the following to be a full, clear, and exact description of the invention, such as will enable others skilled in the art to which it appertains to make and use the same.

This invention relates to an improvement in that class of saws having movable, detachable, or insertible saw-teeth, its object being to simplify and perfect the construction of saw-teeth of this kind so that a saw plate or blade provided therewith may operate with greater strength and efficiency; and the invention therefore consists in the construction, arrangement, and combination of parts, substantially as will be hereinafter described and claimed.

In the accompanying drawings illustrating my invention, Figure 1 is a side view of a section of a saw showing one tooth inserted into its recess, while another recess is left vacant to show its outline and form more distinctly. Fig. 2 is an edge view of the saw as shown in Fig. 1. Fig. 3 is a section on the line $x\ x$ of Fig. 1, taken horizontally. Fig. 4 is a vertical section on the line $y\ y$ of Fig. 1 in partial elevation. Fig. 5 represents perspective views of a tooth and locking-plate. Fig. 6 is another perspective view of a tooth viewed from the other edge. Fig. 7 shows a plan and edge view of the implement used for removing and replacing the teeth.

Like letters of reference designate corresponding parts throughout all the different figures of the drawings.

A represents a portion of a saw plate or blade; B, one of the insertible teeth, and C the locking plate or part which co-operates with the tooth to secure the latter in a fixed position in the edge of the plate.

The edge or periphery of the saw-plate A is provided with a series of recesses $a$ of a general circular or rounded form, corresponding in general outline with the contiguous edges of the teeth and locking-plates located therein, those sections of the periphery of the saw between the said recesses $a$ being curved at $A'$, which curve runs from one end of one recess $a$ to the opposite end of the other recess $a$, so that in this manner the periphery of the saw is provided with a series of projections intervening between the recesses, which we usually find in saws of this class. The edge of each recess $a$ is provided with a tongue $a^3$, preferably beveled at the outer end of the recesses $a$ between said end and the curve $A'$, and thus on the peripheral projections lying between the recesses is a shoulder $a'$, comparatively small in size and at an angle to the edge of the recess, said shoulder $a'$ being provided with the tongue $a^2$, which is preferably larger and more pronounced than the triangular tongue $a^3$, said tongue $a^2$ being preferably of a right-angled form, as seen in the edge view of Fig. 2. The tooth B is expanded or swaged at its point in the usual manner, so that it will cut a kerf of sufficient width to clear the saw-plate, thus obviating friction and consequent heating of the plate. The back edge of the tooth is provided with the triangular or V-shaped groove $b$, which corresponds with the bevel tongue $a^3$ on the edge of the recess, over which tongue this groove is designed to fit, said rear edge of the tooth being convexly curved. Furthermore, the rear edge of the tooth at this outer end is provided with a shoulder $b^2$, at an angle to the remainder of the rear line of the tooth and substantially at a right angle with that outside face of the tooth, which, when the latter is in position, comes into coincidence with the curve $A'$ of the saw periphery. This shoulder $b^2$ is designed to abut against the shoulder $a'$, and therefore said shoulder $b^2$ is provided with a groove $b^3$, preferably right-angled, which is designed to receive the corresponding-shaped tongue $a^2$, formed on the shoulder $a'$. The lower end of the tooth B has a foot or projection D, designed to enter a recess in the locking-plate, although not intended to come into contact with the sides of said recess. Said foot D has its sides plain and flat, not being provided with tongue or groove. The front edge of the tooth is provided with a concave recess E, which for the most part has a plain surface, but which near its upper end is provided with a small groove $e$, preferably of a right-angled form, said groove $e$ being designed to receive a lug on the locking-plate. The locking-plate has a generally curved or semi-lunar outline, its outer edge being curved so as to form a continuous throat in connection with the outer concave edge of the tooth, said locking-plate on its lower edge being provided with a triangular groove $c$ to fit over the groove $a^3$ on the edge of the recess $a$. The upper end of the locking-plate has a rear convexly-curved face F, adapted to enter the concave recess E of the tooth, and on this face F is a small lug $f$, which enters the notch or groove $e$ in the tooth, the lug $f$ being properly shaped to closely and easily fit into the said groove. Furthermore, the upper end of the locking-plate C below the rear convexly-curved face F is provided with a recess G, whose sides $h$ and $h'$ are preferably more or less curved, and the foot D of the tooth enters loosely into this recess G in the manner shown in Fig. 1, said foot D not touching the side of the recess, but simply resting within the same out of contact with the sides, although closely contiguous to both of them, so that a space is left not only between the sides of the foot D and the sides $h$ and $h'$ of the recess, but also a short distance is vacant between the tip of the foot and the apex of the recess. By this connection I make a saw which can stand greater feed and do better and stronger work. The tooth is stronger in the throat, and a firmer combination is made.

The implement I, (shown in Fig. 7,) having the screw-driver point $i$ at one end and the right-angled pin $i'$ at the other end, is employed for the purpose of removing the locking-plate and tooth from their position in the saw periphery. It is operated by inserting one of the pins $i'$ into the perforation in the locking-plate C, and then by a deft manipulation of the implement the locking-plate and the tooth can be removed from position.

By referring to Fig. 1 the relative location of the locking-plate and the tooth in the peripheral recess of the saw is clearly shown. It will be seen that the tooth bears upon the shoulder at $a'$, and that also there is a firm bearing between the upper end of the locking-plate, where there is a tongue-and-groove connection between it and the recessed edge of the tooth. The parts combine together very nicely for practical use, and a strong, firm, and durable combination is furnished.

Having thus described my invention, what I claim as new, and desire to secure by Letters Patent, is—

1. The combination, with the saw-plate having a recess and a tongued shoulder at the outer end of said recess and at an angle thereto, of a saw-tooth having a grooved angular shoulder bearing against the aforesaid tongued shoulder at the outer end of the recess, and the locking-plate having a tongued lug at its upper end adapted to engage a suitable groove on the front edge of the tooth, there being a recess in the locking-plate, into which the foot of the tooth enters loosely without touching, substantially as described.

2. The combination, with the saw-plate A, having recess $a$, with a V-tongue, and an angular shoulder $a'$, with the right-angled tongue, of the tooth B, having a grooved angular shoulder $b^2$, which engages the tongued shoulder $a'$, and having the plain-faced foot D and the curved recess E, with the right-angled groove, and the locking-plate C, having the rearwardly-curved upper end, provided with a right-angled lug that enters the grooved recess on the front edge of the tooth, and having a plain-faced recess within which the plain-faced foot on the tooth loosely lies without touching, substantially as described.

3. The combination, with the saw-plate A, having recess $a$, and angular shoulder $a'$, having right-angled tongue $a^2$, the tooth B, having an angular shoulder $b^2$, provided with the right-angled groove $b^3$ and a right-angled front groove $e$, and the locking-plate having lugs $f$ at its upper end that enter the groove $e$, substantially as described.

4. The combination of the saw-plate A, having recess $a$, and provided with the V-shaped tongue $a^3$, and the shoulder $a'$, having tongue $a^2$, the tooth B, having the convex rear edge provided with groove $b$, and shoulder $b^2$, having groove $b^3$, said tooth having plain-faced foot D and front recess E, grooved at $e$, and the locking-plate C, having the lower edge grooved at $c$, and having the rearwardly-curved upper end F, formed with lug $f$, and likewise the recess G, all the parts being combined substantially as described.

In testimony whereof I affix my signature in presence of two witnesses.

WM. E. BROOKE.

Witnesses:
JOHN D. GRUBER,
H. M. SPOONER.